United States Patent [19]

Auduc et al.

[11] Patent Number: 4,835,046

[45] **Date of Patent: * May 30, 1989**

[54] FABRIC BASED ON GLASS AND CARBON FIBERS AND ARTICLES COMPRISING SUCH A FABRIC

[75] Inventors: Hervé Auduc, Jonage; Jean Aucagne, La Tour Du Pin, both of France

[73] Assignee: Brochier S.A., Decines, France

[ * ] Notice: The portion of the term of this patent subsequent to Sep. 1, 2004 has been disclaimed.

[21] Appl. No.: 38,775

[22] Filed: Apr. 15, 1987

Related U.S. Application Data

[63] Continuation-in-part of Ser. No. 915,792, Oct. 6, 1986, Pat. No. 4,690,851.

[30] Foreign Application Priority Data

Oct. 16, 1985 [FR] France ................................ 8515328

[51] Int. Cl.4 ............................................ D04H 1/58

[52] U.S. Cl. .................................. 428/288; 428/297; 428/367; 428/408; 428/902; 428/920; 428/221; 428/289

[58] Field of Search ............... 428/288, 297, 367, 408, 428/902, 920, 221, 289

[56] References Cited

U.S. PATENT DOCUMENTS

| | | | |
|---|---|---|---|
| 404,727 | 12/1987 | Gorges et al. | 428/288 |
| 2,689,199 | 9/1954 | Pesce | 428/296 |
| 4,356,228 | 10/1982 | Kobayashi et al. | 428/400 |
| 4,440,819 | 4/1984 | Rosser et al. | 428/288 |
| 4,528,223 | 7/1985 | Kumazawa et al. | 428/902 |
| 4,622,192 | 11/1986 | Ma | 428/288 |
| 4,690,851 | 9/1927 | Auduc | 428/116 |
| 4,751,134 | 6/1988 | Chenoweth et al. | 428/288 |

FOREIGN PATENT DOCUMENTS 2917076 10/1980 Fed. Rep. of Germany .

*Primary Examiner*—James J. Bell

*Attorney, Agent, or Firm*—Wenderoth, Lind & Ponack

[57] ABSTRACT

The present invention relates to a fiber-based, fire-resistant fabric comprising a mixture of:

(a) about 50–90% by weight of textured fire-resistant fibers;

(b) about 10–50% by weight of technical fibers of stiffness greater than that of textured glass, provided that if fibers (a) are fibers of textured glass, fibers (b) are not carbon fibers.

The preferred textured fibers are glass fibers. Fibers (b) can be fibers of carbon, aramide or silicon carbide. The fabrics are useful for the manufacture of fire-resistant composite articles impregnated with phenolic resin.

10 Claims, No Drawings

FABRIC BASED ON GLASS AND CARBON FIBERS AND ARTICLES COMPRISING SUCH A FABRIC

This application is a continuation-in-part of application Ser. No. 915,792 filed on Oct. 6, 1986 now U.S. Pat. No. 4,690,851.

The present invention relates to technical fabrics with noteworthy fire-resistant properties. The invention also relates to articles comprising such a fabric, in particular articles obtained by impregnation of these fabrics with a resin, possibly in combination with other constituents, thus producing structures with numerous fields of application, for example in the aeronautics industry and in all cases where there is a need for products with high fire-resistance.

U.S. Pat. No. 4,690,851 relates to a fiber-based fabric with high fire-resistance, low weight per unit area and good mechanical properties, characterized in that it comprises a mixture of about 50 to 90% by weight of textured glass fibers and about 10 to 50% by weight of carbon fibers. Such fabric is highly suitable, following impregnation with the customary resins, advantageously phenolic resins, for the embodiment of articles such as pieces for fitting out the interior of aircraft, which must simultaneously meet a certain number of requirements. It is thus possible to obtain honeycomb-like structures above to meet the most stringent and recent standards of the aeronautics industry.

By continuing their studies in the field of fabrics comprising fire-resistant fabrics, the applicants have been led to develop new fabrics one constituent of which comprises textured fibers.

The present invention, therefore, relates to a fiber-based, fire-resistant fabric comprising a mixture of:

(a) about 50–90% by weight of fire-resistant textured fibers;

(b) about 10–50% by weight of technical fibres of stiffness greater than that of textured glass, provided that if fibers (a) are fibers of textured glass, fibers (b) are not carbon fibers.

The first constituent of the fabric according to the invention comprises textured fire-resistant fibers. The expression "textured" in terms of the present description designates a fiber in which the orientation of each filament is random. In this technical field the term teased fibers is also employed. This type of fiber is known to those skilled in the art and can be prepared by known methods using various treatments. The textured fibers used in the fabric according to the invention are continuous or discontinuous. Continuous fibers are, in general, preferred as they give better results during the oiling process.

The textured fibres of the fabric according to the invention have the property of being "fire-resistant", an expression which indicates at least M1, and preferably M0 classification according to French standard NF P No. 92-507 (Oct. 1975) entitled "Classification of materials used in construction", drawn up in accordance with the Order of June 4, 1973 (Journal Officiel of July 26, 1973) and published by the French Standardization Organization (AFNOR), Tour Europe, Paris La Défense, France. The first tests for materials such as the fabrics of the invention are carried out in accordance with standard NF P No. 92-503 (October 1975).

For applications of the fabrics according to the invention where high fire-resistance is necessary, it is important that the fibers which comprise the fabric do not release heat, i.e. in the case of combustion, the thermal energy released should not be capable of propagating the flame, either directly, or by incandescent particles or melting drops. For certain requirements of the present invention, which are not necessarily as stringent as the most demanding standards of the aeronautics industry, the "fire-resistant" fibers are those which are categorized M0 or M1 according to the abovementioned classification.

The second constituent of the fabric according to the invention comprises technical fibers which present adequate stiffness characteristics and which, in combination with fibers (a), give the tissue overall fire-resistance properties to meet the abovementioned standards. In terms of the present description, the expression "stiffness greater than that of textured glass" means that the fibers (b) have a tensile strength greater than about 55,000 MPa. The preferred fibers, which have such properties as well as satisfactory fire-resistance, are carbon fibers, aramide fibers and silicon carbide fibers. When carbon fibers are used, they usually comprise 1,000 to 6,000 filaments, for example about 3,000 filaments. The relative proportions of the two constituents of the fabric according to the invention will be chosen as a function of the specific problems to be solved. Indeed, it is advisable to take into account a certain number of parameters such as unit mass, fire-resistance properties, the overall mechanical characteristics and the price of the final fabric.

In the combination of the fibers of the fabric according to the invention, the fibers (a) have the essential feature of being textured, which has numerous advantages compared with analogous non-textured fibers. These advantages are particularly apparent when, as is preferred, the fabric according to the invention is used for the manufacture of composite materials, by impregnating the fabric, which is arranged in a suitable number of laminates, with a resin, such as a phenolic resin. The degree of impregnation can be high, and in general is from 30 to 60%, in particular from 50 to 60%.

Textured fibers give articles with better surface characteristics, since they possess a resin absorption capacity markedly higher than corresponding fibers that are smooth or non-textured. Further, textured fibers give a better fiber/resin interface, since they present a larger area of contact with the resin. In addition, fabrics and articles based on textured fibers have a low mass per unit area due to the "expanded" structure of the said fibers.

In addition, when fibers (a) and fibers (b) have appreciably different linear thermal expansion coefficients, the use of textured fibers (a) in the fabrics according to the invention allows elimination of the detrimental effect of the difference in expansion between fibers (a) and fibers (b). The random orientation of the filaments of the textured fibers (a) improves compensation for the difference in expansion. In contrast, non-textured fibers mixed with fibers (b) can cause warping and deformation in the finished articles obtained after resin impregnation.

It can also be noted that the drapability (or deformability) of the fabrics comprising the textured fibers (a) is better than if non-textured fibers are used.

The fibers of category (a) that are preferred by the invention are glass fibers. Such textured fibers have a weight per unit length which can vary over quite a large range, in particular from 11 to 126 tex (1 tex represents the number of grams per kilometer of fiber). Other examples of usable fibres are textured aramide fibers, for example those available commercially under the brand name "Kevlar", type 49, which have undergone prior texturization treatment.

Hence, as mentioned above, examples of fibers (b) are carbon fibers, aramide fibers and silicon carbide fibers.

When the present description refers to a mixture of fibers (a) and fibers (b), it goes without saying that in each of these constituents there may be fibers of different types. As an example, fibers (b) can be chosen individually from among carbon fibers, aramide fibers and silicon carbide fibers, but it is also possible to employ any combinations of such fibers, such as fibers of carbon and of aramide, fibers of carbon and of silicon carbide, fibers of aramide and of silicon carbide and other combinations.

The fabrics according to the invention can be used for the manufacture of any articles that may be prepared by impregnation of resin and molding. It is thus possible to prepare laminates comprising several layers of fabric impregnated with resin, two or three layers for example. It is also possible, as is known to those skilled in the art, to impregnate a fabric according to the invention with a resin such as a phenolic resin and to glue it to one or both faces of a honeycombed structure. This gives sandwich structures of greater inertia. These manufacturing techniques are known to those skilled in the art and no further explanation is necessary. For all practical purposes, reference may be made, for example, to the book "Guide Pratique des Materiaux Composites" ("Practical Guide to Composite Materials"), 2nd edition (1985) by M. Geier and D. Duedal, Editions Lavoisier (France).

The articles and structures comprising fabrics according to the invention have various applications, each time that products with adequate fire-resistance are needed. Apart from the aeronautics industry, the construction industry can also be cited, where such materials can be used for fitting out the interiors of theaters, public places and other buildings.

The invention will be illustrated by the following examples, without being limited in any way.

EXAMPLE 1

In this example, a basic mixture of 67% by weight of textured glass fibers and 33% of aramide fibers ("Kevlar" type 49) was used. The weight per unit length of the textured glass fibers was 34 tex.

A fabric was woven from this mixture of fibers and the following mechanical characteristics were determined in laboratory tests for laminated samples comprising 12 layers of impregnated fabric, so as to give test specimens of thickness 3 mm.

Bending strength: 340 MPa
Bending modulus: 27,000 MPa
Shearing strength: 30 MPa

A modified phenolic resin (Vicotex 250 from Brochier SA) was used to give a degree of impregnation of 55%.

EXAMPLE 2

In this example, a fabric similar in every way to that of example 1 was prepared, except that the aramide fibers were replaced by the same proportion (33%) of Nicalon-type silicon carbide SiC fibers. The mechanical characteristics were as follows:

Bending strength: 380 MPa
Bending modulus: 29,000 MPa
Shearing strength: 36 MPa

What is claimed is:

1. A fire-resistant, fiber-based fabric comprising a mixture of:

(a) about 50–90% by weight of fire resistant textured fibers;

(b) about 10–50% by weight of technical fibers of stiffness greater than that of textured glass, provided if fibers (a) are fibers of textured glass, fibers (b) are not carbon fibers.

2. A fabric according to claim 1, in which fibers (a) are glass fibers.

3. A fabric according to claim 1, in which fibers (b) have a tensile strength greater than about 55,000 MPa.

4. A fabric according to claim 1, in which fibers (b) comprise carbon fibers.

5. A fabric according to claim 1, in which fibers (b) comprise aramide fibers.

6. A fabric according to claim 1, in which fibers (b) comprise silicon carbide fibers.

7. An article comprising a fabric according to claim 1 and an impregnating resin.

8. An article according to claim 7, in which the impregnating resin is a phenolic resin.

9. An article according to claim 7, in which the resin content ranges from 30 to 60% by weight with respect to the weight of the article.

10. An article according to claim 7, in which the resin content ranges from 50 to 60% by weight with respect to the weight of the article.

* * * * *